Oct. 24, 1950 — T. N. BOURKE — 2,526,630
SEAL DEVICE FOR CONTAINERS
Filed June 3, 1948 — 2 Sheets-Sheet 1
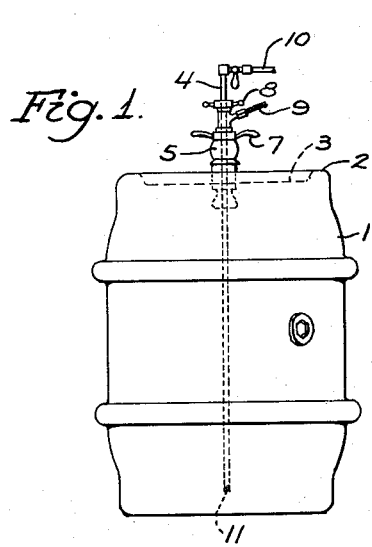
Fig. 1.
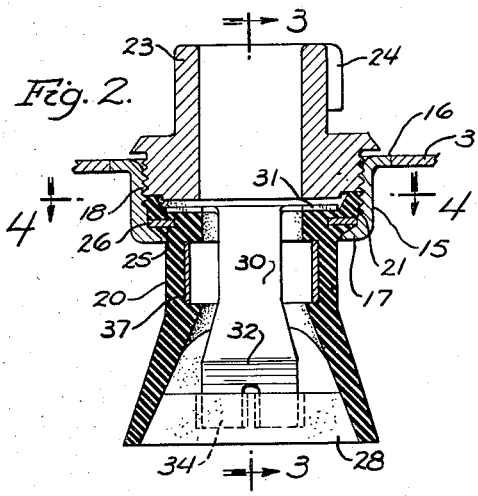
Fig. 2.
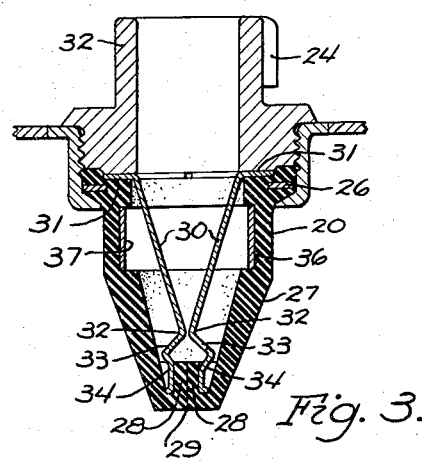
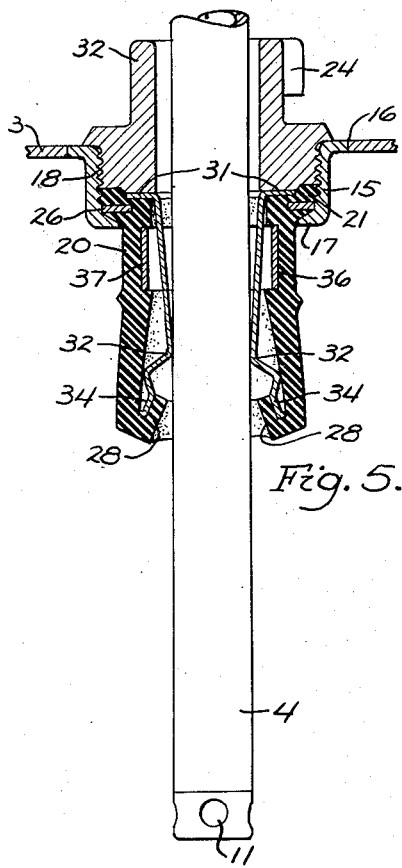
Fig. 5.
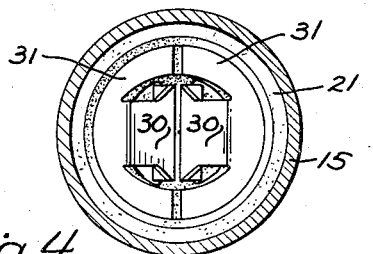
Fig. 4.
INVENTOR.
Thomas N. Bourke
BY
ATTORNEYS.

Oct. 24, 1950 T. N. BOURKE 2,526,630
SEAL DEVICE FOR CONTAINERS
Filed June 3, 1948 2 Sheets-Sheet 2

INVENTOR.
Thomas N. Bourke
BY
ATTORNEYS.

Patented Oct. 24, 1950

2,526,630

UNITED STATES PATENT OFFICE 2,526,630

SEAL DEVICE FOR CONTAINERS

Thomas N. Bourke, Grosse Pointe, Mich.

Application June 3, 1948, Serial No. 30,881

13 Claims. (Cl. 217—103)

This invention relates to a seal or valve construction, particularly useful in connection with the handling or storage of gas or liquids under pressure. This application is a continuation in part of copending application Serial No. 791,575 filed December 13, 1947.

The general objects of the invention are to provide an improved seal structure for holding fluid under pressure and which, it is believed, is particularly adaptable for use with containers for a charged beverage, such as beer. The sealing element which, itself, is of improved construction, is comprised of a plastic substance, such as natural or synthetic rubber or other plastic substance, which has meeting surfaces which, when in engagement with each other, provide a sealing action, and which, when separated permits a flow of fluid from the container. When used with kegs for beer, a draft tube may be passed into and through the sealing element which serves to open the same and the structure embodies a novel arrangement for providing for frictional engagement with the draft tube to thus protect the material of the rubber or plastic sealing element. Since the seal structure is thought to be particularly adaptable for use with kegs for handling beer, the following disclosure is made in connection with such a container.

Structures made in accordance with the invention are disclosed in the accompanying drawings:

Fig. 1 is a general view showing a beer keg with a tap applied thereto.

Fig. 2 is an enlarged cross sectional view showing the seal structure as applied to or in the wall of a keg.

Fig. 3 is a sectional view taken substantially on line 3—3 of Fig. 2.

Fig. 4 is a sectional view taken on line 4—4 of Fig. 2 showing some of the features.

Fig. 5 is a view similar to Fig. 3 showing a draft tube inserted through the sealing element.

Figure 6:
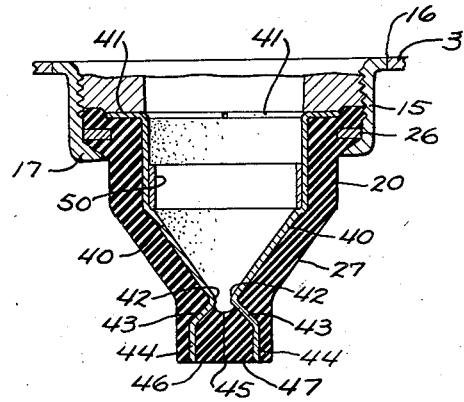
Fig. 6 is a sectional view similar to Fig. 2 showing a modified form of the invention.

A container is illustrated at 1 as being in the form of a metal keg, having a chimb 2 and a head 3. In Fig. 1 a so-called tap construction of rather well known form is shown applied to the keg and this includes a draft tube 4 which projects into the keg and through a body 5 which is applicable to the seal structure of the present invention and may be tightened thereon by a handle 7. The draft tube is tightened in position by turning a handle 8. Air or carbon dioxide under pressure may be furnished through a connection 9 which is conducted into the keg outside the draft tube and the beer is drawn off through the draft tube and through a suitable conduit 10, the draft tube having in its lower end suitable inlet openings 11 (Fig. 5).

The structure of the seal is illustrated in Fig. 2 and it may be set into the head 3 of the keg by the use of a bushing 15 which may be welded into the head as at 16, the bushing having an inwardly extending flange 17 and being internally threaded as shown at 18. The form of keg shown is of metal preferably of a corrosion resisting metal, such as a form of stainless steel.

The valve or sealing element of plastic substance, as aforesaid, and which, for convenience, will hereinafter be termed "rubber," is preferably formed in molded shape. It has an intermediate body portion 20 of tubular form provided with a flange 21 at one end for substantially fitting in the bushing. The sealing element is passed through the bushing in its assembly. A coupling member 23 has a screw threaded portion arranged to be threaded into the bushing 15, or to be otherwise secured therein, to clamp the flange 21 against the lip or flange 17. This coupling member is fastened with projections as at 24 for detachably connecting with the body 5 of the so-called tap. Inasmuch as it is necessary to tightly clamp the flange 21 in position, it is reinforced to prevent substantial deformation and to prevent it from being contracted and pushed through the opening defined by the flange 17. To this end, the flange 21 is provided with a peripheral groove 25 for the reception of a rigid reinforcing ring 26 which is preferably a metal ring.

Extending from the intermediate body portion 20 the sealing element has tapering walls 27 and these walls have inwardly extending lips 28, the faces of which come together in contact with each other as at 29 to provide the seal. The lipped end of the sealing element is elongated in one direction as shown in Fig. 2. Yieldable elements are provided for holding the faces of the lips together, such as two spring arms 30, each provided with a substantial semi-circular base 31 (Fig. 3), resting upon the flange 21 in a recess provided therefor and held clamped by the member 23. The arms 30 extend downwardly as shown in Fig. 3, and have portions 32 which approach each other near the ends of the arms and diverging portions 33 extending from which are end portions or fingers 34 which engage behind the lips 28. Thus, the spring arms 30 urge the lips together in sealed relationship. These spring arms serve as friction means for engaging the draft tube 4 which may be inserted therein for opening the seal. When the draft tube 4 is inserted into the seal, the structure opens up as shown in Fig. 5 so that the contents of the container may flow out through the seal and specifically through the tube 4.

In the formation of the rubber sealing element, it may be molded into form as one piece and the end where the inclined walls meet each other may be severed at the location 29 to provide the contacting interfaces. On the other hand, the sealing element may be molded with the lips 28 formed and molded separately from each other so that no severing is necessary.

In order to reinforce the sealing member against collapse, in the event there is sufficient pressure in the container to cause or tend to cause collapse, the member is formed with a circumferential recess 36 for the reception of a reinforcing ring 37. This ring may be of metal or other adequately strong and rigid material. In order for the sealing member to hold pressure particularly when the pressure is low and approaches atmospheric, the faces which contact each other as at 29 must be smooth and uniform to provide a good surface to surface engagement. Furthermore, the spring action of the arms 30 maintain the faces in engagement under pressure so that a substantial internal pressure may be sealed and collapse of the sealing element prevented by the reinforcing ring 31. Such metal parts as, for example, the mental arms 30, the reinforcing ring 37, and the ring 26, are preferably of corrosion resisting metal such as one of the so-called stainless steels.

In the modified form shown in Fig. 6, some of the parts are the same as those heretofore described, and the same reference characters are employed. This includes the head of the barrel, the bushing and the fitting 23. In this form, the spring elements are preferably molded into the rubber sealing element. The spring elements have arms 40 which follow the contour on the inside of the sealing element and each has a semi-circular base 41 resting on the flange 21. Instead of having inwardly extending lips, as shown in the previous form, the inner end of the sealing element terminates in a sufficiently heavily bodied structure. The arms 40 have portions 42 which lie in close proximity to each other and outwardly diverging portions 43 extending therefrom with end portions 44. The portions 43 and 44 are molded within the end structure and this end structure may be severed or formed to provide two end elements 46 and 47 with interfaces sealingly engaging each other as at 45. In this form the spring arms urge the interfaces together for the sealing action and are in position to be engaged and frictionally contacted by a draft tube or other element when the same is projected into or through the sealing element. In this form, the reinforcing ring 50, to prevent collapse of the hollow body portion, may be inserted within the spring elements 40.

Figure 7:
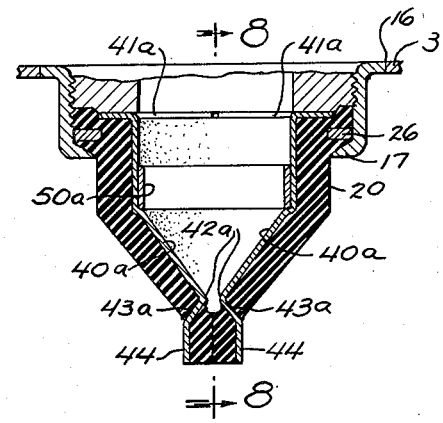
Fig. 7 is a sectional view similar to Fig. 6 showing another modified form of the invention.
Figure 8:
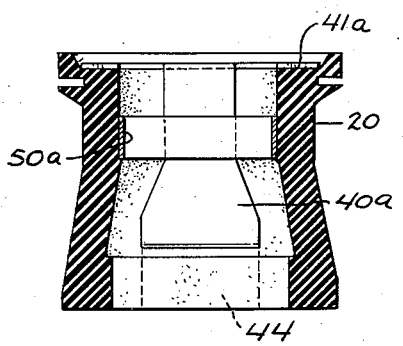
Fig. 8 is a sectional view taken on line 8—8 of Fig. 7.

In the modified form shown in Figs. 7 and 8, the spring elements 40a have base portions 41a and are similar to those shown in Fig. 6. However, the outwardly diverging portions 43a which extend from the adjacent parts 42a project through the material of the sealing element so that their lower ends, as at 44, are exposed. These metallic elements are likewise molded directly into the sealing element and the reinforcing ring 50a is advantageously disposed within the spring arms.

Figure 9:
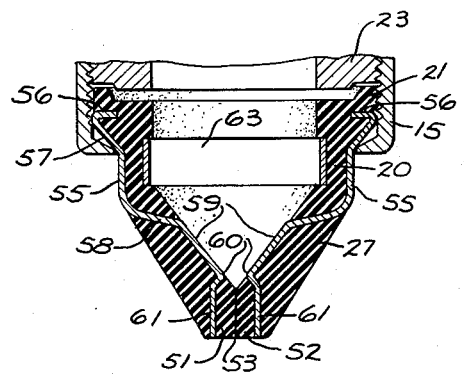
Fig. 9 is a view similar to Fig. 6 illustrating a still further modified form of the invention.
Figure 10:
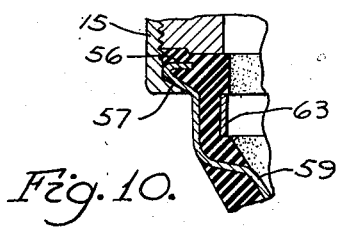
Fig. 10 is a sectional view illustrating a full clamped position of the structure shown in Fig. 9.

In the form shown in Figs. 9 and 10, the rubber sealing element is substantially the same as previously described and the same reference characters are applied to like parts, having a flange 21, a cylindrical body portion 20, and inclined walls 27. The inner end has parts 51 and 52, with faces which meet and seal against each other as at 53. Here again the faces which meet at 53 are formed by severing the material or by forming the space therebetween when the element is molded.

The spring elements, generally illustrated at 55, each has a base portion 56 of somewhat circular form, and which extends inwardly and molded into the flange 21. Each spring element has an exposed downwardly inclined part 57 and a portion 58 which extends inwardly and through the rubber of the sealing element to provide internally exposed portions 59 for engagement with a draft tube or other element to be passed therethrough. The lower ends of the portions 59 come into close proximity with each other as at 60 and the extreme end portions as at 61 lie within the end portions 52. Thus, it will be appreciated that this spring structure holds the faces together and the parts 59 are engaged by the draft tube or other element so as to spread the faces apart as above described. These spring elements are, of course, molded into the body of the rubber sealing element.

As the parts are illustrated in Fig. 9, the coupling 23 has not, as yet, been screwed down tightly. As the parts are shown in Fig. 10, the coupling has been screwed tightly in position. This causes the portions 57 of the springs to engage the flange 17 so that the metallic spring elements are flexed inwardly to thus cause the faces at 53 to more tightly engage each other and make a more effective seal. In this form the reinforcing ring to prevent collapse, is illustrated at 63.

While, as above stated, the disclosure has been made with reference to kegs, or containers for beer, which, as is well known, is a liquid beverage held under gaseous pressure; this is but one example of the use of the seal. The device may be used in containers which do not have a fixed geometric shape such, for example, as a collapsible container for holding gas or liquid.

I claim:

1. A seal structure for a container adapted to hold fluid under pressure, a bushing adapted to be mounted in a wall of the container, a sealing member of flexible plastic having a flange disposed in the bushing and having a tubular extension projecting into the container, said tubular extension being of flattened form at its inner end so that surfaces of the tubular wall come together in face to face engagement to provide a seal, the inner end of the tubular extension having inwardly projecting lips substantially contiguous with the faces which are in engagement with each other, and means providing a pair of spring arms anchored substantially at the flange of the sealing member with the arms projecting into the sealing member, said arms having end portions engaging said lips to yieldably hold said surfaces in face to face engagement, said arms being formed to frictionally engage an element inserted therein and extracted therefrom to protect the surfaces against frictional engagement with the said element.

2. A seal structure operable for controlling flow of liquid comprising, an outer member, a sealing member of flexible plastic having a flange portion disposed within the outer member and sealed thereto in liquid-tight manner, said sealing member being of hollow formation and having a tubular extension, said tubular extension being of flattened form at its end remote from the flange so that surfaces of the tubular wall come together in face to face engagement to provide a seal, the end of the tubular extension having inwardly projecting lips substantially contiguous with the faces which are in engagement with each other, and means providing a pair of spring arms anchored substantially at the flanged end of the sealing member with the arms projecting into the tubular extension, said arms having end portions engaging the lips to yieldably hold said surfaces in face to face engagement, said arms being formed to frictionally engage an element passed therethrough to spread the arms and separate said faces, said arms protecting the surfaces of the sealing member against frictional engagement with said element.

3. A seal structure for a container adapted to hold a fluid comprising, a bushing adapted to be mounted in a wall of the container, said bushing having an inwardly extending flange, a sealing member of flexible plastic having a flange disposed in the bushing and having a tubular extension projecting into the container, means for clamping the flange of the sealing member against the flange of the bushing, a reinforcing ring embedded in the flange of the sealing member to hold the flange against collapsing, said tubular extension being of flattened form in its inner end so that surfaces of the tubular wall come together in face to face engagement to provide a seal, the inner end of the tubular extension having inwardly extending lips substantially contiguous with the said faces, spring elements anchored adjacent the flange of the sealing element and projecting into the tubular extension, said spring elements having end portions engaging said lips to normally urge said faces into engagement, said spring elements being formed so as to frictionally engage elements projectable into and through a sealing element to spread the faces apart for the opening of the sealing element.

4. A seal structure for a container adapted to hold a fluid comprising, a bushing adapted to be mounted in a wall of the container, said bushing having an inwardly extending flange, a sealing member of flexible plastic having a flange disposed in the bushing and having a tubular extension projecting into the container, means for clamping the flange of the sealing member against the flange of the bushing, a reinforcing ring embedded in the flange of the sealing member to hold the flange against collapsing, said tubular extension being of flattened form in its inner end so that surfaces of the tubular wall come together in face to face engagement to provide a seal, the inner end of the tubular extension having inwardly extending lips substantially contiguous with the said faces, spring elements anchored adjacent the flange of the sealing element and projecting into the tubular extension, said spring element having end portions engaging said lips to normally urge said faces into engagement, said spring elements being formed so as to frictionally engage elements projectable into and through a sealing element to spread the faces apart for the opening of the sealing element, and a reinforcing ring in the hollow extension serving to prevent the extension from collapse incident to pressure in the container.

5. A seal structure for a container adapted to hold fluid under pressure comprising, a body member of formed plastic material having a hollow intermediate portion, a flange at the outer end of the body member adapted to be clamped in position in a wall of the container with the body member projecting into the container, the body member having a portion extending inwardly from the hollow intermediate portion with converging walls terminating with an inner end of flattened formation, said walls having surfaces substantially at their inner ends extending lengthwise of the flattened formation and disposed in face to face engagement to provide a sealing contact, spring means having parts arranged to be anchored substantially at the flange and having arms extending inwardly from the flange, said arms having portions which lie in close proximity to each other within the converging walls and adapted to be engaged by an element inserted therein to spread the said engaging faces apart to open the sealed engagement, the inner ends of said arms being in engagement with the plastic material at the inner end of the body member and serving yieldably to hold said faces in surface to surface engagement with each other.

6. A seal structure for a container adapted to hold fluid under pressure comprising, a body member of formed plastic material having a hollow intermediate portion, a flange at the outer end of the body member adapted to be clamped in position in a wall of the container with the body member projecting into the container, the body member having a portion extending inwardly from the hollow intermediate portion with converging walls terminating with an inner end of flattened formation, said walls having surfaces substantially at their inner ends extending lengthwise of the flattened formation and disposed in face to face engagement to provide a sealing contact, spring means having parts arranged to be anchored substantially at the flange and having arms extending inwardly from the flange, said arms having portions which lie in close proximity to each other within the converging walls and adapted to be engaged by an element inserted therein to spread the said engaging faces apart to open the sealed engagement, the inner ends of said arms being in engagement with the plastic material at the inner end of the body member and serving yieldably to hold said faces in surface to surface engagement with each other, and a reinforcing ring disposed within the hollow intermediate portion to hold said portion against collapse incident to pressure in the container.

7. A seal structure for a container adapted to hold fluid under pressure comprising, a body member of formed plastic material having a hollow intermediate portion, a flange at the outer end of the body member adapted to be clamped in position in a wall of the container with the body member projecting into the container, a reinforcing ring embedded in said flange to hold the flange against substantial distortion when it is clamped in position, the body member having a portion extending inwardly from the hollow intermediate portion with converging walls terminating with an inner end of flattened formation, said walls having surfaces substantially at their inner ends extending lengthwise of the flattened formation and disposed in face to face engagement to provide a sealing contact, spring means having parts arranged to be anchored substantially at the flange and having arms extending inwardly from the flange, said arms having portions which lie in close proximity to each other within the converging walls and adapted to be engaged by an element inserted therein to spread the said engaging faces apart to open the sealed engagement, the inner ends of said arms being in engagement with the plastic material at the inner end of the body member and serving yieldably to hold said faces in surface to surface engagement with each other.

8. A seal structure for a container adapted to hold fluid under pressure comprising, a body member of formed plastic material having a hollow intermediate portion, a flange at the outer end of the body member adapted to be clamped in position in a wall of the container with the body member projecting into the container, the body member having a portion extending inwardly from the hollow intermediate portion with converging walls terminating with an inner end of flattened formation, said walls having surfaces substantially at their inner ends extending lengthwise of the flattened formation and disposed in face to face engagement to provide a sealing contact, a pair of spring members, each having a portion associated with the flange to anchor the spring members, said spring members having arms extending inwardly from the flange and having converging portions adapted to be engaged by an element inserted through the body member to thereby spread the spring arms and spread the converging walls to separate the contacting faces, said spring arms serving to yieldably hold the said faces in surface to surface engagement to provide a seal, said spring members having portions lying within and molded in the plastic material adjacent the inner end of the body member.

9. A seal structure for a container adapted to hold fluid under pressure comprising, a body member of formed plastic material having a hollow intermediate portion, a flange at the outer end of the body member adapted to be clamped in position in a wall of the container with the body member projecting into the container, the body member having a portion extending inwardly from the hollow intermediate portion with converging walls terminating with an inner end of flattened formation, said walls having surfaces substantially at their inner ends extending lengthwise of the flattened formation and disposed in face to face engagement to provide a sealing contact, a pair of spring members, each having a portion associated with the flange to anchor the spring members, said spring members having arms extending inwardly from the flange and having converging portions adapted to be engaged by an element inserted through the body member to thereby spread the spring arms and spread the converging walls to separate the contacting faces, said spring arms serving to yieldably hold the said faces in surface to surface engagement to provide a seal, said spring members having end portions embedded in the plastic material adjacent the inner end thereof.

10. A seal structure for a container adapted to hold fluid under pressure comprising, a body member of formed plastic material having a hollow intermediate portion, a flange at the outer end of the body member adapted to be clamped in position in a wall of the container with the body member projecting into the container, the body member having a portion extending inwardly from the hollow intermediate portion with converging walls terminating with an inner end of flattened formation, said walls having surfaces substantially at their inner end extending lengthwise of the flattened formation and disposed in face to face engagement to provide a sealing contact, a pair of spring members, each having a flange portion embedded in the flange of the body member, said spring members having portions passing through said converging walls and exposed on the interior of the body member and adapted to frictionally engage an element to be passed through the body member to spread said engaging faces apart, said spring members having end portions embedded in the plastic material at the inner end of the member and on opposite sides of the engaging faces and said spring arms adapted to hold the engaging faces in surface to surface sealed engagement.

11. A seal structure for an opening in a pressure container comprising a hollow body member of flexible material formed at one end with means for securing it in said opening and having a portion projecting into said container, the inner end of said portion having an opening formed by a straight slit defined by interengaging flat faces normally disposed in face to face engagement to provide sealing contact, a pair of metallic oppositely disposed yieldable spring arms secured to and enclosed by said body member, the inner ends of said arms bearing on said flexible material on opposite sides of said faces and serving yieldably to hold said faces in surface to surface engagement with each other, said spring arms normally converging inwardly and substantially spanning the interior of said hollow body member and then extending inwardly into said bearings on said flexible material on opposite sides of said faces so as to prevent a tubular element inserted through said opening from engaging said faces, said spring arms during inserting movement of said tubular element being engageable thereby to expand opposed walls of said sealing member to open said slit so as to permit said tubular element to pass freely therethrough.

12. Seal structure according to claim 11 including a rigid cylinder secured within and in contact with the sides of said hollow sealing member adjacent the end thereof secured in said opening so as to resist collapse of said sealing member under the pressure to which it is exposed in said container.

13. Seal structure according to claim 11 wherein said spring arms are at least partially embedded in said flexible material.

THOMAS N. BOURKE.

REFERENCES CITED

The following references are of record in the file of this patent:

UNITED STATES PATENTS

| Number | Name | Date |
| --- | --- | --- |
| 512,832 | Layden | Jan. 16, 1894 |
| 584,091 | Leidich | June 8, 1897 |
| 2,328,948 | Bourke | Sept. 7, 1943 |